(12) United States Patent
Yoshida

(10) Patent No.: US 12,083,940 B2
(45) Date of Patent: Sep. 10, 2024

(54) SEAT BACK FRAME FOR AUTOMOBILE

(71) Applicant: KABUSHIKI KAISHA KOBE SEIKO SHO (KOBE STEEL, LTD.), Hyogo (JP)

(72) Inventor: Masatoshi Yoshida, Kobe (JP)

(73) Assignee: KOBE STEEL, LTD., Hyogo (JP)

( * ) Notice: Subject to any disclaimer, the term of this patent is extended or adjusted under 35 U.S.C. 154(b) by 114 days.

(21) Appl. No.: 17/935,474

(22) Filed: Sep. 26, 2022

(65) Prior Publication Data
US 2023/0101408 A1 Mar. 30, 2023

(30) Foreign Application Priority Data
Sep. 27, 2021 (JP) .................. 2021-156875

(51) Int. Cl.
*B60N 2/68* (2006.01)
(52) U.S. Cl.
CPC ..................... *B60N 2/68* (2013.01)
(58) Field of Classification Search
CPC ....................................................... B60N 2/68
See application file for complete search history.

(56) References Cited

U.S. PATENT DOCUMENTS

| 10,414,307 | B2 * | 9/2019 | Suzuki | B60N 2/68 |
| 2006/0061182 | A1 * | 3/2006 | Park | B60N 2/1842 297/378.1 |
| 2016/0347223 | A1 | 12/2016 | Akaike et al. | |
| 2017/0312806 | A1 * | 11/2017 | Suzuki | B21D 47/01 |
| 2017/0313224 | A1 * | 11/2017 | Akaike | B60N 2/0732 |
| 2018/0222357 | A1 * | 8/2018 | Mochizuki | B60N 2/68 |
| 2018/0319300 | A1 * | 11/2018 | Festag | B29C 70/222 |
| 2019/0255976 | A1 * | 8/2019 | Katoh | B60N 2/544 |
| 2023/0098914 | A1 * | 3/2023 | Yoshida | B60N 2/688 297/452.18 |

FOREIGN PATENT DOCUMENTS

| CN | 108688521 A | * | 10/2018 | ......... B60N 2/01583 |
| DE | 4303006 A1 | * | 8/1994 | ............... B60N 2/68 |
| FR | 2623702 A1 | * | 6/1989 | |
| JP | 2013-189089 A | | 9/2013 | |
| JP | 2015-101286 A | | 6/2015 | |
| KR | 20240010223 A | * | 1/2024 | |
| WO | WO-2019058854 A1 | * | 3/2019 | ............... B60N 2/42 |

OTHER PUBLICATIONS

The extended European search report issued by the European Patent Office on Feb. 20, 2023, which corresponds to European Patent Application No. 22197693.9-1012 and is related to U.S. Appl. No. 17/935,474.

* cited by examiner

*Primary Examiner* — Timothy J Brindley
(74) *Attorney, Agent, or Firm* — Studebaker & Brackett PC

(57) ABSTRACT

A seat back frame for automobile includes a first side frame and a second side frame that are arranged apart from each other in a vehicle width direction, an upper frame that connects an upper end portion of the first side frame and an upper end portion of the second side frame, and an upper bracket that is attached to the upper end portion of the first side frame and guides a seat belt. The first side frame includes a columnar member made of an aluminum alloy extruded material and having a closed cross-section portion in a cross-section perpendicular to a vehicle vertical direction, and a plate-shaped reinforcing member made of high-tension steel, joined to the columnar member, and extending to a vehicle rear side of the columnar member.

11 Claims, 5 Drawing Sheets

SEAT BACK FRAME FOR AUTOMOBILE

CROSS-REFERENCE TO RELATED APPLICATIONS

This application claims priority of Japanese Patent Application No. 2021-156875 filed on Sep. 27, 2021, the contents of which are incorporated herein by reference.

BACKGROUND OF THE INVENTION

Field of the Invention

The present disclosure relates to a seat back frame for automobile.

Description of Related Art

In the seat back frame for automobile, a structure incorporating a seat belt is known. In such a structure, a large load is applied to the seat back frame via the seat belt when the automobile suddenly decelerates or collides. Therefore, in order to suppress occurrence of buckling deformation, a seat back frame having high load-bearing performance is required.

JP 2015-101286 A and JP 2013-189089 A each disclose a seat back frame for automobile having high load-bearing performance. In the seat back frame, a vehicle front side portion has a closed cross-sectional shape, and exhibits high load-bearing performance. In addition, a vehicle rear side portion has a plate shape, and is used for joining with various other members. The seat back frame is made of an aluminum alloy extruded material, and these shapes are integrally formed. Further, a large space above a seat surface is secured by curving an upper portion of the seat back frame rearward of a vehicle.

SUMMARY OF THE INVENTION

In the seat back frames of JP 2015-101286 A and JP 2013-189089 A, since complicated shapes are integrally formed, it is difficult to ensure dimensional accuracy required in design. In addition, in order to curve the upper portion of the seat back frame rearward of the vehicle, it is necessary to perform bending after extruding, and an adverse effect such as wrinkles and cracks occurs particularly in a plate-shaped portion on the rear side of the vehicle, and it may be difficult to ensure high dimensional accuracy.

An object of the present disclosure is to ensure high dimensional accuracy with a simple structure while having high load-bearing performance, in a seat back frame for automobile having a built-in seat belt.

The present disclosure provides a seat back frame for automobile including: a first side frame and a second side frame that are arranged apart from each other in a vehicle width direction; an upper frame that connects an upper end portion of the first side frame and an upper end portion of the second side frame; and an upper bracket that is attached to the upper end portion of the first side frame and guides a seat belt, in which the first side frame includes: a columnar member made of an aluminum alloy extruded material and having a closed cross-section portion in a cross-section perpendicular to a vehicle vertical direction; and a plate-shaped reinforcing member made of high-tension steel, joined to the columnar member, and extending to a vehicle rear side of the columnar member.

According to this configuration, in the seat back frame for automobile having a built-in seat belt, a suitable shape and material are employed from the viewpoint of load bearing, structural simplicity, and dimensional accuracy. Specifically, when the automobile suddenly decelerates or collides, a compressive load is applied to the vehicle front side of the seat back frame via the seat belt, and a tensile load is applied to the vehicle rear side of the seat back frame. In response, in the above configuration, since the columnar member disposed on the vehicle front side is made of an aluminum alloy extruded material having a low specific gravity and has a closed cross-section portion resistant to the compressive load, it is possible to have high load-bearing performance and achieve weight reduction. In addition, since the reinforcing member disposed on the vehicle rear side has a plate shape made of high-tension steel which is strong against the tensile load and inexpensive, it is possible to have high load-bearing performance and achieve cost reduction. Here, the high-tension steel refers to steel having a tensile strength of 780 MPa or more. In addition, even when the seat back frame has a curved shape that requires bending, the reinforcing member can be joined to the columnar member after being bent, and thus it is not necessary to bend the reinforcing member, and it is possible to suppress occurrence of adverse effects such as wrinkles and cracks in the reinforcing member. As described above, in the first side frame, since the columnar member and the reinforcing member are formed separately from each other and have a suitable shape and material, it is possible to have high load-bearing performance and ensure high dimensional accuracy with a simple structure.

A lower end of the first side frame may be fixed, and a lower portion of the reinforcing member may be larger than an upper portion of the reinforcing member in a vehicle front-rear direction.

According to this configuration, since the lower end of the first side frame is fixed and the upper bracket is disposed at the upper end, a relatively high bending moment is applied to the lower portion and a relatively low bending moment is applied to the upper portion. Therefore, by making section modulus of the lower portion larger than that of the upper portion, required load-bearing performance can be efficiently ensured.

A yield stress of the reinforcing member may be twice or more a yield stress of the columnar member.

According to this configuration, it is possible to make a concrete design from the viewpoint of cost.

The columnar member may include the closed cross-section portion and a flange portion protruding rearward of the vehicle by a length of 20 mm or more and 30 mm or less from the closed cross-section portion, and the reinforcing member may be joined to the flange portion.

According to this configuration, since the reinforcing member is joined to the flange portion, manufacturing is easy. In particular, since the flange portion has a dimension of 20 mm or more, mechanical joining such as self-piercing rivet (SPR) and blind rivet can be easily performed. Further, since the flange portion has a dimension of 30 mm or less, a structure of the columnar member can be easily maintained. Furthermore, even when the seat back frame has a curved shape, if the flange portion has a length of 30 mm or less, it is possible to suppress the occurrence of adverse effects such as wrinkles and cracks due to bending of the columnar member.

The columnar member may have a lower portion and an upper portion extending linearly, and a curved intermediate portion connecting the lower portion and the upper portion, and the flange portion may not protrude from the intermediate portion but protrude from the lower portion and the upper portion.

According to this configuration, since the columnar member has the curved intermediate portion, a large space above the seat surface can be secured. In addition, since the flange portion does not protrude from the intermediate portion, it is possible to avoid the adverse effects of the above-described wrinkles and cracks.

The reinforcing member may be bent when viewed in the vehicle vertical direction.

According to this configuration, since the reinforcing member is bent, rigidity of the reinforcing member can be increased. Therefore, higher load-bearing performance and component rigidity can be ensured. In particular, since the reinforcing member is separate from the columnar member, the shape of the reinforcing member can be variously set as described above.

The closed cross-section portion may have a polygonal shape formed by a front wall located on the vehicle front side and other walls when viewed in the vehicle vertical direction, and the front wall may be thicker than the other walls.

According to this configuration, since the front wall is located on the vehicle front side as compared with the other walls, a relatively large compressive load is applied to the front wall, but since the front wall is made relatively thick, high load-bearing performance can be effectively exhibited.

According to the present disclosure, it is possible to have high load-bearing performance and ensure high dimensional accuracy with a simple structure, in a seat back frame for automobile having a built-in seat belt.

DETAILED DESCRIPTION OF THE PREFERRED EMBODIMENT

Hereinafter, embodiments of the present disclosure will be described with reference to the accompanying drawings.

Figure 1:
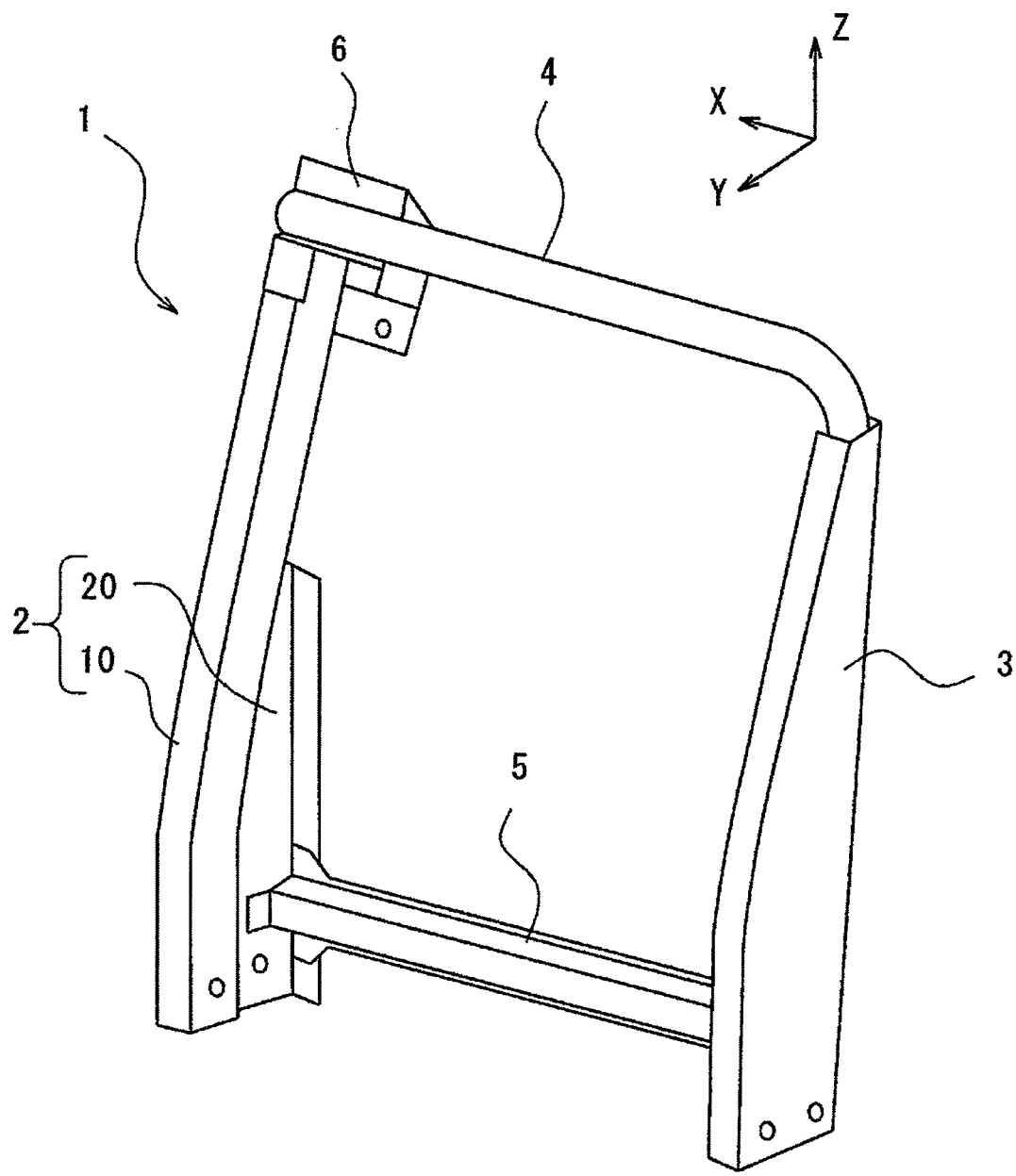
FIG. 1 is a perspective view of a seat back frame for automobile according to an embodiment of the present disclosure.

FIG. 1 is a perspective view of a seat back frame 1 for automobile according to an embodiment of the present disclosure. In FIG. 1, an outward direction in a vehicle width direction is indicated by a reference sign X, a forward direction in a vehicle front-rear direction is indicated by a reference sign Y, and an upward direction in a vehicle vertical direction is indicated by a reference sign Z.

A seat back frame 1 includes a first side frame 2 and a second side frame 3 that are arranged apart from each other in the vehicle width direction. The first side frame 2 and the second side frame 3 extend in the vehicle vertical direction. The first side frame 2 is disposed outside in the vehicle width direction, and the second side frame 3 is disposed inside in the vehicle width direction.

The seat back frame 1 includes an upper frame 4 that connects an upper end portion of the first side frame 2 and an upper end portion of the second side frame 3. Further, the seat back frame 1 includes a lower frame 5 that connects a lower portion of the first side frame 2 and a lower portion of the second side frame 3. The upper frame 4 and the lower frame 5 extend in the vehicle width direction. In the present embodiment, the upper frame 4 is a circular tube member made of aluminum alloy, and the lower frame 5 is a plate member made of high-tension steel.

The seat back frame 1 is a seat belt built-in type, and includes a retractor (not illustrated) that winds a seat belt and an upper bracket 6 that guides the seat belt. In the present embodiment, the upper bracket 6 is attached to the upper end portion of the first side frame 2 and an outer end portion of the upper frame 4 in the vehicle width direction. Further, the retractor is attached to the upper bracket 6. However, the retractor may be attached to a component other than the upper bracket 6, for example, may be attached to the lower frame 5 described later.

Figure 2:
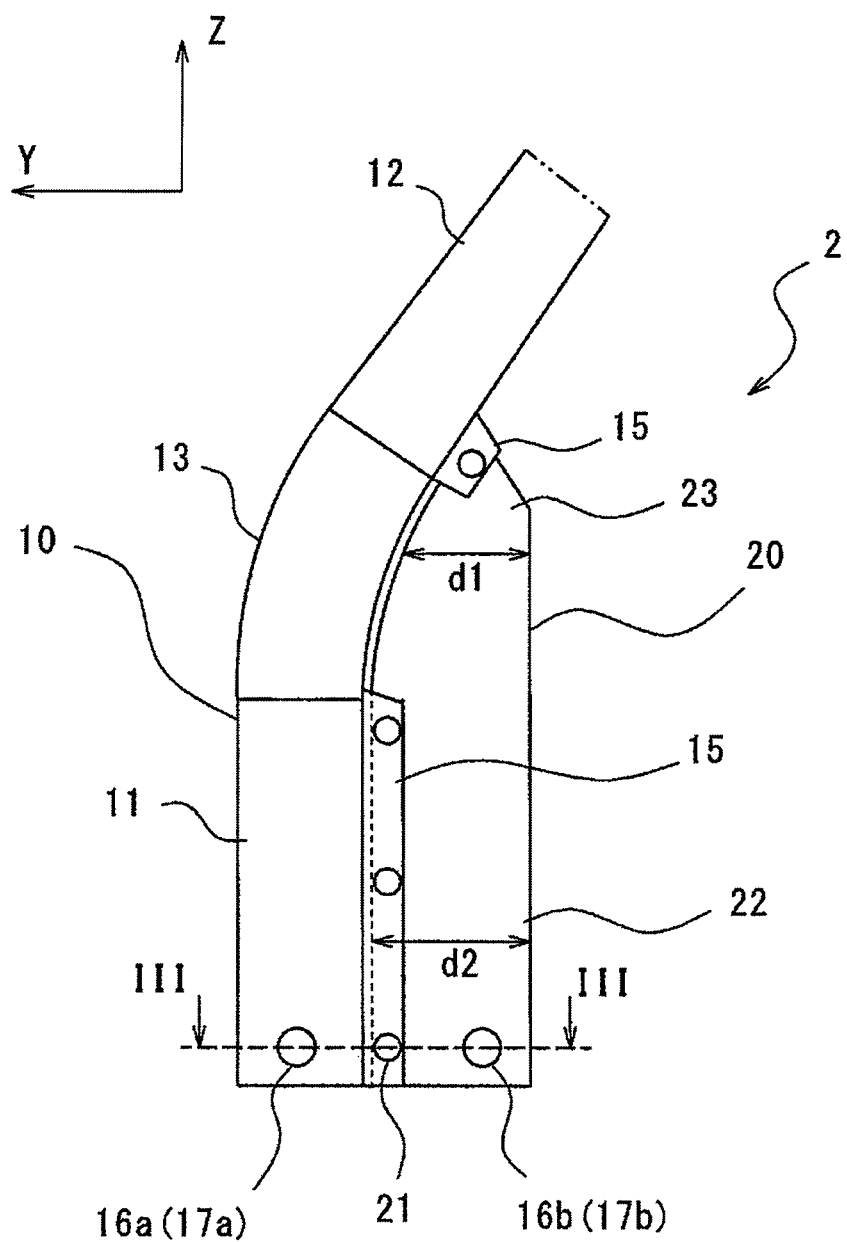
FIG. 2 is a side view of a first side frame.
Figure 3:
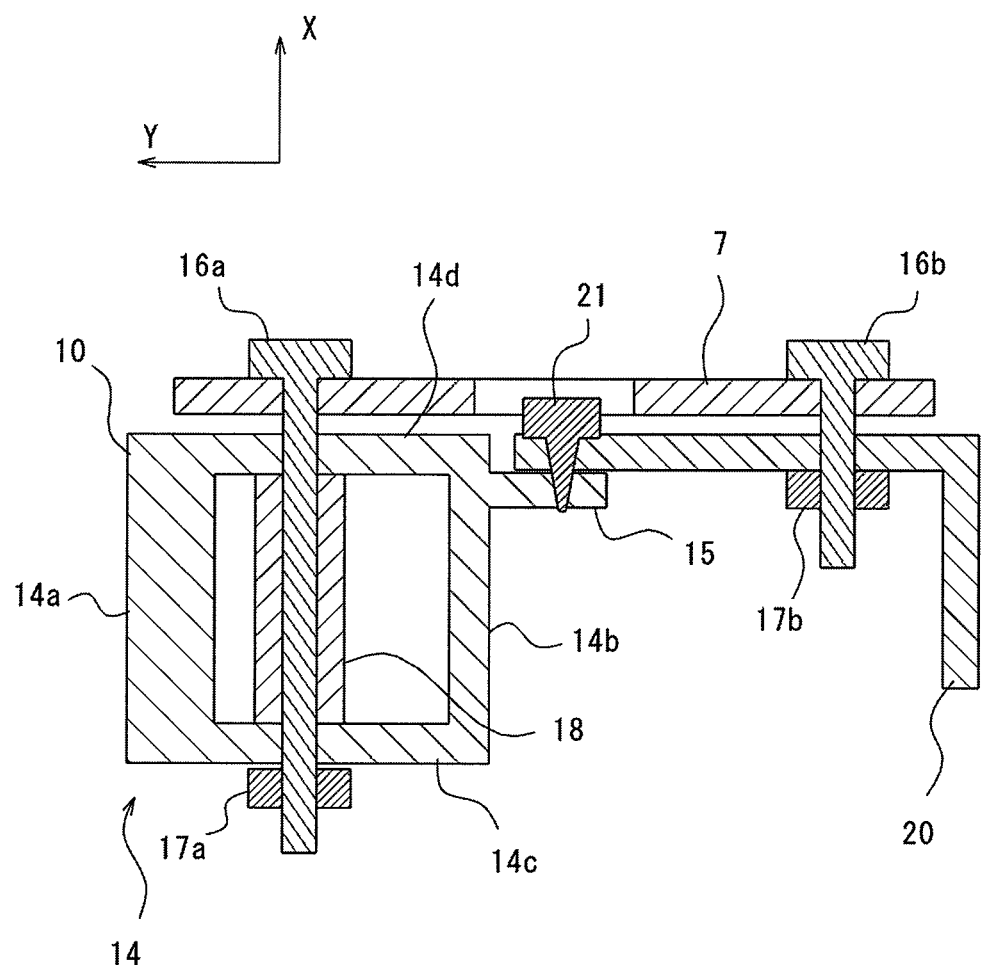
FIG. 3 is a cross-sectional view taken along line III-III of FIG. 2.

FIG. 2 illustrates a side view of the first side frame 2. Further, FIG. 3 illustrates a cross-sectional view taken along line of FIG. 2.

A lower end of the first side frame 2 is fixed to a seat cushion frame (not illustrated) via a recliner 7. The first side frame 2 includes a columnar member 10 made of an aluminum alloy extruded material and a reinforcing member 20 made of a high-tension steel plate. Here, the high-tension steel refers to steel having a tensile strength of 780 MPa or more.

The columnar member 10 includes a lower portion 11 and an upper portion 12 extending linearly, and a curved intermediate portion 13 connecting the lower portion 11 and the upper portion 12.

The columnar member 10 has a closed cross-section portion 14 in a cross-section perpendicular to the vehicle vertical direction. In the present embodiment, the closed cross-section portion 14 is rectangular. In the present embodiment, the closed cross-section portion 14 includes a front wall 14a located on the vehicle front side, a rear wall 14b located on the vehicle rear side, and side walls 14c and 14d connecting the front wall 14a and the rear wall 14b. The front wall 14a is thicker than the other walls 14b to 14d.

In the present embodiment, the columnar member 10 includes, in addition to the closed cross-section portion 14, a flange portion 15 protruding rearward of the vehicle by a length of 20 mm or more and 30 mm or less from the closed cross-section portion 14. In the present embodiment, the flange portion 15 continuously extends rearward of the vehicle from the rear wall 14b. Further, the flange portion 15 does not protrude from the intermediate portion 13 but protrudes from the lower portion 11 and the upper portion 12. Further, in the vehicle vertical direction, the flange portion 15 is provided on the entire lower portion 11 and a part of the upper portion 12. That is, in the manufacturing process, the flange portion 15 in the intermediate portion 13 and the other part of the upper portion 12 is cut and removed.

The reinforcing member 20 is made of high-tension steel and has a plate shape extending toward the vehicle rear side of the columnar member 10. In the present embodiment, the reinforcing member 20 is joined to the flange portion 15 of the columnar member 10 by a self-piercing rivet (an SPR) (see an SPR portion 21). Further, the reinforcing member 20 is bent at a right angle at one position when viewed in the vehicle vertical direction. That is, the reinforcing member 20 is formed in a substantially L-shape so as to extend in the vehicle front-rear direction and the vehicle width direction.

A lower portion 22 of the reinforcing member 20 is larger than an upper portion 23 in the vehicle front-rear direction (d2>d1). Preferably, the length in the vehicle front-rear direction gradually increases from the upper portion 23 toward the. lower portion 22.

In the present embodiment, a yield stress of the reinforcing member 20 is twice or more a yield stress of the columnar member 10. Thus, it is possible to make a concrete design from the viewpoint of cost. Preferably, the yield stress of the reinforcing member 20 is 3 times or more the yield stress of the columnar member 10.

In the present embodiment, the first side frame 2 is fastened to the recliner 7 by bolts 16a and 16b and nuts 17a and 17b. The bolt 16a penetrates the closed cross-section portion 14 in the vehicle width direction, and is coated with a collar 18 in the closed cross-section portion 14. The collar 18 supports the side walls 14c and 14d in the vehicle width direction.

Referring to FIG. 1, the second side frame 3 is made of high-tension steel and has a plate shape. The second side frame 3 is bent at a right angle at two positions when viewed in the vehicle vertical direction, that is, the second side frame 3 is formed in a substantially C-shape. Similarly to the reinforcing member 20, the second side frame 3 has a lower portion 3a larger than an upper portion 3b in the vehicle front-rear direction.

The lower frame 5 connects the lower portion of the reinforcing member 20 of the first side frame 2 and the lower portion of the second side frame 3.

According to the seat back frame 1 of the present embodiment, the following effects are obtained.

In the seat back frame 1 for automobile having a built-in seat belt, a suitable shape and material are employed from the viewpoint of load bearing, structural simplicity, and dimensional accuracy. Specifically, in the seat back frame 1, when the automobile suddenly decelerates or collides, a compressive load is applied to the vehicle front side of the seat back frame 1 via the seat belt, and a tensile load is applied to the vehicle rear side of the seat back frame 1. In response, in the present embodiment, since the columnar member 10 disposed on the vehicle front side is made of an aluminum alloy extruded material having a low specific gravity and has a closed cross-section portion 14 resistant to the compressive load, it is possible to have high load-bearing performance and achieve weight reduction. Further, since the reinforcing member 20 disposed on the vehicle rear side has a plate shape made of high-tension steel which is strong against the tensile load and inexpensive, it is possible to have high load-bearing performance and achieve cost reduction. Further, the seat back frame 1 of the present embodiment has a curved shape that requires bending, but the reinforcing member 20 can be joined to the columnar member 10 after being bent, and thus it is not necessary to bend the reinforcing member 20, and it is possible to suppress occurrence of adverse effects such as wrinkles and cracks in the reinforcing member 20. As described above, in the first side frame 2, since the columnar member 10 and the reinforcing member 20 are formed separately from each other and have a suitable shape and material, it is possible to have high load-bearing performance and ensure high dimensional accuracy with a simple structure.

The lower end of the first side frame 2 is fixed, the upper bracket 6 is disposed at the upper end, and a load is applied to the upper bracket 6 via the seat belt, and thus a relatively high bending moment is applied to the lower portion 22 and a relatively low bending moment is applied to the upper portion 23. Therefore, by making the lower portion 22 of the reinforcing member 20 larger than the upper portion 23 in the vehicle front-rear direction (d2>d1), section modulus of the lower portion 22 can be made larger than that of the upper portion 23, and required load-bearing performance can be efficiently ensured.

Since the reinforcing member 20 is joined to the flange portion 15, manufacturing is easy. In particular, since the flange portion 15 has a dimension of 20 mm or more, SPR joining can be easily performed. Further, since the flange portion 15 has a dimension of 30 mm or less, a structure of the columnar member 10 can be easily maintained. Furthermore, even when the seat back frame 1 has a curved shape, if the flange portion 15 has a length of 30 mm or less, it is possible to suppress the occurrence of adverse effects such as wrinkles and cracks due to bending of the columnar member.

According to this configuration, since the columnar member 10 has the intermediate portion 13 so as to curve rearward of the vehicle, a large space above the seat surface can be secured. In addition, since the flange portion 15 does not protrude from the intermediate portion 13, it is possible to avoid the adverse effects of the above-described wrinkles and cracks.

Since the reinforcing member 20 is bent, rigidity of the reinforcing member 20 can be increased. Therefore, higher load-bearing performance and component rigidity can be ensured. In particular, since the reinforcing member 20 is separate from the columnar member 10, the shape of the reinforcing member 20 can be variously set as in the present embodiment and other bent shapes.

Since the front wall 14a is located on the vehicle front side as compared with the other walls 14b to 14d, a relatively large compressive load is applied to the front wall 14a, but since the front wall 14a is made relatively thick, high load-bearing performance can be effectively exhibited.

(First Modification)

Figure 4:
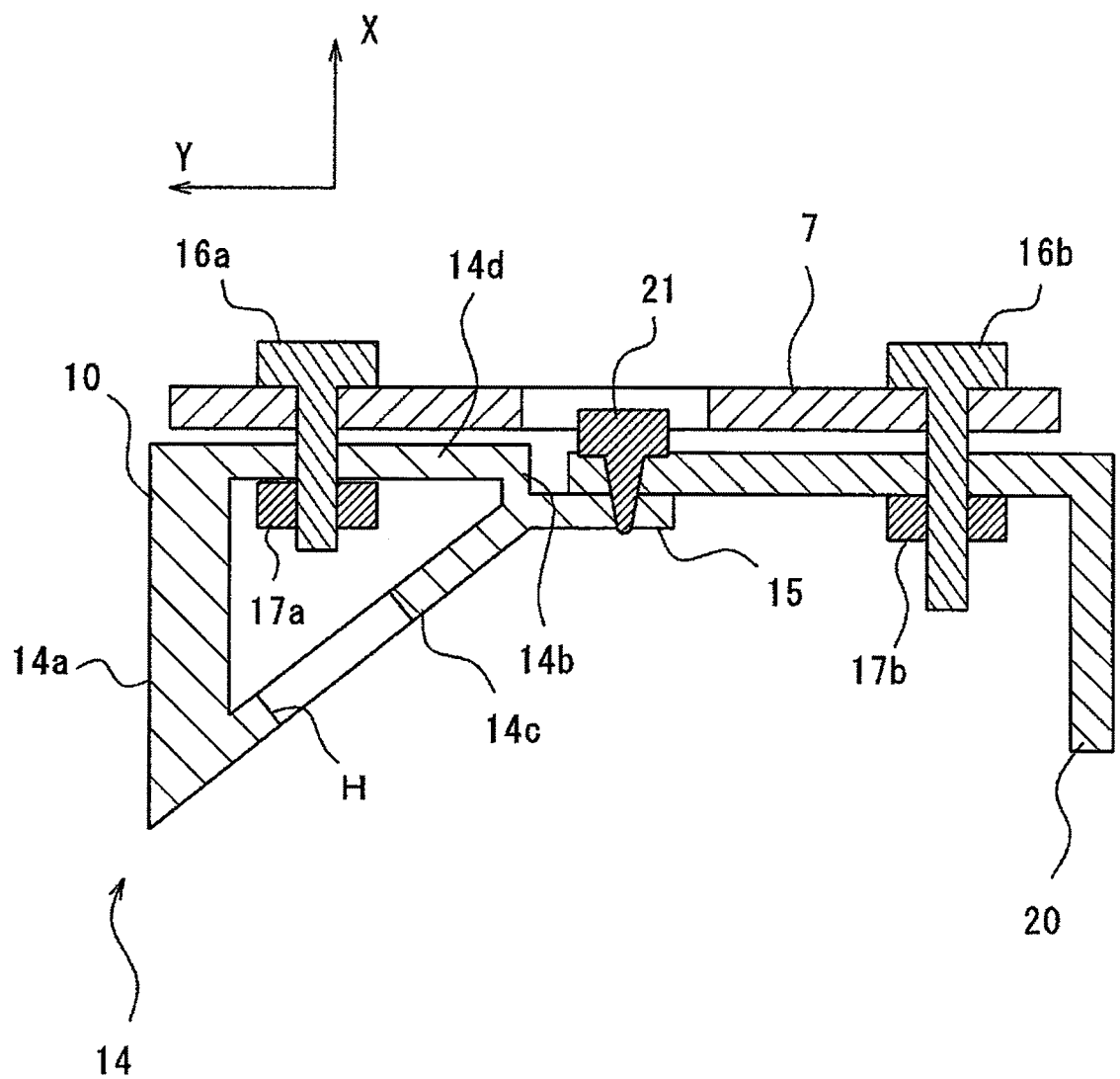
FIG. 4 is a cross-sectional view illustrating a first modification of the first side frame corresponding to FIG. 3.

FIG. 4 is a cross-sectional view illustrating a first modification of the first side frame 2 corresponding to FIG. 3.

In the present modification, the shape of the closed cross-section portion 14 is different from that of the above embodiment, but the present modification is substantially the same as in the above embodiment except for the shape of the closed cross-section portion 14, and thus a detailed description thereof may be omitted.

In the present modification, the closed cross-section portion 14 has a trapezoidal shape. Also in the present modification, the front wall 14a is thicker than the other walls 14b to 14d.

In the present modification, the bolt 16a terminates in the closed cross-section portion 14. Therefore, a working hole H is provided in the side wall 14c of the closed cross-section portion 14 to improve workability.

As described in the above embodiment and the present modification, the shape of the closed cross-section portion 14 is not particularly limited, and may be, for example, any polygonal shape.

(Second Modification)

Figure 5:
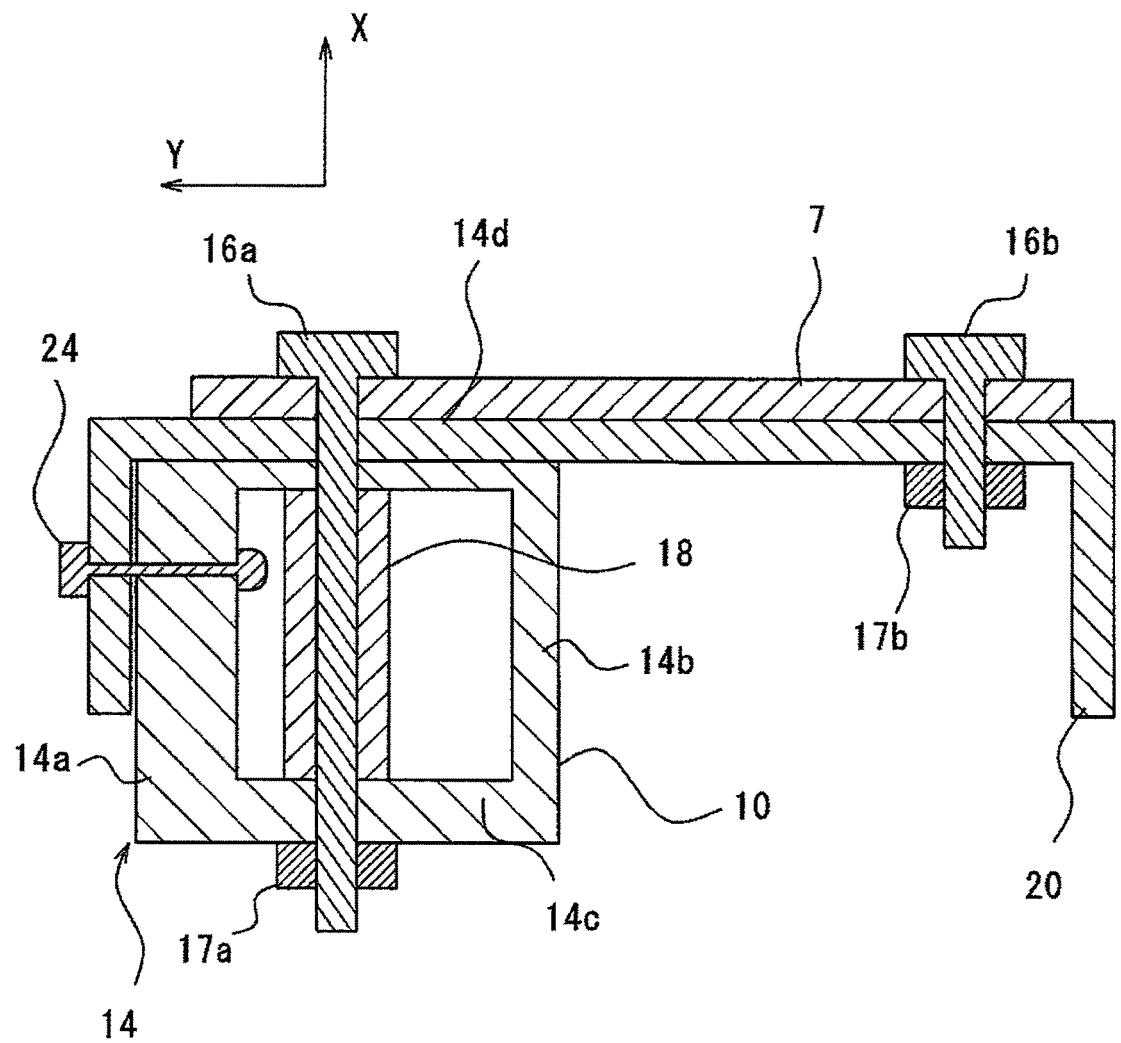
FIG. 5 is a cross-sectional view illustrating a second modification of the first side frame corresponding to FIG. 3.

FIG. 5 is a cross-sectional view illustrating a second modification of the first side frame 2 corresponding to FIG. 3.

In the present modification, the columnar member 10 does not have the flange portion 15 (see FIGS. 3 and 4). Therefore, the SPR portion 21 (FIGS. 3 and 4) is neither provided, and a blind rivet 24 is alternatively used, and the reinforcing member 20 is joined to the columnar member 10.

The reinforcing member 20 is bent at a right angle at two positions when viewed in the vehicle vertical direction, that is, is formed in a substantially C-shape, and is also disposed partially in front of the columnar member 10. That is, the C-shaped reinforcing member 20 is disposed to hold the columnar member 10.

The reinforcing member 20 is fastened to the front wall 14a by the blind rivet 24 in addition to fastening of the bolts 16a and 16b and the nuts 17a and 17b of the above embodiment.

As described in the above embodiment and the present modification, the shape of the reinforcing member 20 is not particularly limited, and may be, for example, a plate shape having an arbitrary bent shape.

Although specific embodiments of the present disclosure and modifications thereof have been described above, the present disclosure is not limited to the above embodiments, and various modifications can be made within the scope of the present disclosure.

What is claimed is:

1. A seat back frame for automobile comprising:
    a first side frame and a second side frame that are arranged apart from each other in a vehicle width direction;
    an upper frame that connects an upper end portion of the first side frame and an upper end portion of the second side frame; and
    an upper bracket that is attached to the upper end portion of the first side frame and guides a seat belt,
    wherein the first side frame includes:
    a columnar member made of an aluminum alloy extruded material and having a closed cross-section portion in a cross-section perpendicular to a vehicle vertical direction; and
    a plate-shaped reinforcing member made of high-tension steel, joined to the columnar member, and extending to a vehicle rear side of the columnar member;
    wherein the columnar member includes a flange portion protruding rearward of the vehicle from the closed cross-section portion by a length of 20 mm or more and 30 mm or less from the closed cross-section portion, and the reinforcing member is joined to the flange portion.

2. The seat back frame for automobile according to claim 1, wherein
    a lower end of the first side frame is fixed, and
    a lower portion of the reinforcing member is larger than an upper portion of the reinforcing member in a vehicle front-rear direction.

3. The seat back frame for automobile according to claim 1, wherein a yield stress of the reinforcing member is twice or more a yield stress of the columnar member.

4. The seat back frame for automobile according to claim 1, wherein
    the columnar member has a lower portion and an upper portion extending linearly, and a curved intermediate portion connecting the lower portion and the upper portion, and
    the flange portion does not protrude from the intermediate portion but protrudes from the lower portion and the upper portion.

5. The seat back frame for automobile according to claim 1, wherein the reinforcing member is bent when viewed in the vehicle vertical direction.

6. The seat back frame for automobile according to claim 1, wherein
    the closed cross-section portion has a polygonal shape formed by a front wall located on a vehicle front side and other walls when viewed in the vehicle vertical direction, and
    the front wall is thicker than the other walls.

7. The seat back frame for automobile according to claim 2, wherein a yield stress of the reinforcing member is twice or more a yield stress of the columnar member.

8. The seat back frame for automobile according to claim 2, wherein the reinforcing member is bent when viewed in the vehicle vertical direction.

9. The seat back frame for automobile according to claim 3, wherein the reinforcing member is bent when viewed in the vehicle vertical direction.

10. The seat back frame for automobile according to claim 4, wherein the reinforcing member is bent when viewed in the vehicle vertical direction.

11. The seat back frame for automobile according to claim 7, wherein the reinforcing member is bent when viewed in the vehicle vertical direction.

* * * * *